Patented Apr. 22, 1930

1,755,531

UNITED STATES PATENT OFFICE

HENRI BEAUFOUR, OF BEAUVAIS, FRANCE

PROCESS FOR THE EXTRACTION OF THE ALBUMINO-CASEINS OF VEGETABLE ORIGIN AND FOR THE SEPARATION OF SUCH ALBUMINO-CASEINS FROM AMYLACEOUS MATTER

No Drawing. Application filed October 11, 1926, Serial No. 141,031, and in France October 23, 1925.

My invention relates to the obtainment of the albumino-caseins of vegetable origin, and the separation of the same from amylaceous substances, the resulting products having physico-chemical characteristics resembling those of the albumino-caseins of animal origin and chiefly in the fact that they are soluble in the alkalies and are coagulated by heat, in view of their utilization for all industrial purposes for which the albumens and caseins of animal origin are now employed.

The said invention consists essentially in the treatment of cereals or their germs, or of oleaginous grain or seeds from which the oil has been optionally removed, soja arachis such as leguminous grain or seeds, oil nuts or the like in a suitably ground state, or their oil cake, by means of a solution (of the proper strength) of a chloride of the alkalies, alkali earths, or of a mixture of such chlorides.

It consists chiefly in the utilization, as the chloride serving to dissolve the albumino-caseins contained in plants or portions of the same, of sodium chloride in the state of more or less concentrated sea water. In particular, I may commence the treatment by causing the substance to swell in the concentrated salt solution.

The invention further relates to the treatment by suitable bases and chiefly by lime or other alkali earth hydrates, before or after the use of the salt solution, and by the said treatment I am enabled to purify the substance to a certain extent and to obtain a casein which can be coagulated with a particular facility.

It further relates to the washing of the coagulated substance by water which has been given a certain ionizing power.

My invention also comprises, as new manufactured products, the albumino-caseins obtained by the aforesaid process, which are free from alkali-albumens, starch, fatty matter and soaps, and whose physico-chemical characteristics are very near those of the albumino-caseins of animal origin and which are particularly well adapted for coagulation by heat, so that they may be utilized as substitutes for the albumens and caseins of animal origin for all industrial purposes for which these latter are employed.

In particular, for the extraction of the aforesaid albumino-caseins from cereals or their germs, or from oleaginous grain or seeds from which the oil has been optionally removed, or from their oil cake, I may proceed as follows:

The said material, which is suitably ground, is treated with a solution containing 50–100 grams per liter of water of an alkaline chloride (of potassium ammonium or sodium), an alkaline earth chloride (of calcium or barium) or an earth chloride (of magnesium) in concentrated solution, of 3 per cent strength at the minimum, or preferably 5 to 10 per cent, or sea water in the natural state or concentrated, inasmuch as the albuminoid solutions of such concentrated salts will be partially precipitated when diluted with water. I operate either by maceration or by a systematic lixiviation, or by a like method of exhaustion, at a temperature below 50 degrees C., i. e., without attaining the coagulating temperature of the albumens nor the temperature of the formation of clear starch. The resulting albuminous solution, which is free from starch and fatty matter, and is optionally treated with an alkali or and alkali earth hydrate in slight excess in order to precipitate the inert substances dissolved in the chloride water, is separated from the insoluble substances which are not dissolved or are precipitated (such as celluloses, insoluble mineral substances, or the like) by adequate mechanical means, and is then treated by an organic or an inorganic acid, by a salt of copper, lead or magnesium, or by rennet (labferment), or by a like substance adapted to coagulate the casein, in order to precipitate the albuminoid matter. The optimum conditions of coagulation will depend upon the degree of ironization of the albuminous solution. The casein is then collected either by settling, by filtering or by centrifugal treatment; it is washed with ionized water to remove the glucose substances, the mineral salts, or any acid reaction, and is then dried at a temperature below 50 degrees C. in a strong current of air.

The caseo-albumen may also be obtained from its chlorinated solution by coagulation (with the optional addition of lime), but in this case, I prefer to bring it preliminarily to a suitable state of ionization, as will be hereinafter set forth.

The addition water not containing chlorides will also precipitate the caseo-albumen.

A process which offered excellent results in practice is given in detail as follows:

The material under treatment, such as oil cake from peanuts from which the oil has been extracted by a first operation, is suitably ground and is then worked up into a soft paste with natural sea water containing 3 per cent of NaCl or a larger percentage of salt, or with a 5 per cent solution of sea salt or rock salt, or with a 5 per cent solution of calcium chloride, and is then allowed to stand for the time necessary for the swelling of the proteic substances.

The material can then be advantageously treated with sea water in the natural state or more or less concentrated, or by water containing 5 per cent of salt, or containing calcium chloride, either in the hot or cold state, and in the proper proportion.

It has been found that the proportion affording good results is 10 parts of sea water, or of a 3 per cent salt solution, for 1 part of the oil cake employed.

I operate by maceration or by working up, or by systematic lixiviation, or by like methods for the exhaustion of the material, and at a temperature below 50 degrees C.

I thus obtain an albuminous solution which may then be treated with lime, in the state of sifted milk of lime, and this affords a precipitate of insoluble substances; the resulting solution has a greenish-yellow colour. The available caseinates remain in solution, and the precipitate chiefly contains the nucleinates, glutens and various other inert and indeterminate substances.

This operation serves to free the solution from all prejudicial substances, and I can thus obtain even in the cold state, a suitable casein which can be employed in the various industries such as the manufacture of plastic substances by agglomeration, the manufacture of casein paints and adhesive substances, baryta paper, and sizing, or for the fixing of colours, or the like.

It should be noted that the lime treatment might also be effected before the caseo-albumen is dissolved in the chloride solution. My experience seems to show that in this case the lime treatment will peptize the albuminoids while facilitating their subsequent swelling, but that in this event the inert matter will be insoluble in the chlorine salts.

The solution resulting from the successive treatments with chlorides and with lime is separated from the insoluble matter by the known methods, among which I prefer to employ filtering under a pressure of several atmospheres, or a centrifugal treatment at a very high speed. The solution is of a pale yellow colour, and should be quite clear.

As above stated, the caseo-albumen may be precipitated by any of the usual reagents, and I chiefly employ the following substances, with success, even in the cold state:

The acetic, hydrochloric and sulphurous acids, solutions of sulphides, sulphites, bisulphites or hydrosulphites, solutions of the alums, a solution of sulphate of aluminium, or suitable mixtures of such substances, or the like.

I have observed that the coagulation is a maximum when the ionizing power attains a determined value for a given material under treatment, and such values will depend upon the nature of the said substance. The critical ionizing value (which is near the isoelectric point) for the treatment of the earth nut (or peanut), material, is Ph=5.2 approximately. This will allow of the exact measurement of the quantity of coagulating agents to be added to the solution for the obtainment of a complete precipitation. Further, it is simply necessary to observe the ionizing power of the solution at all times by means of a suitable reagent, for instance methyl red, in order to find whether the coagulating operation has been completed.

The resulting coagulated substance is then separated from its mother liquor by suitable means. It is not to be washed with all kinds of water, but (preferably) with water whose ionizing power has been brought to the critical value corresponding to the raw material employed. In this manner there is no danger that the coagulated substance will be re-dissolved or will become swelled during the washing.

After the curdy material has been separated and disintegrated, it is dried and ground by the known methods.

As an accessory treatment, the caseo-albumen which is precipitated by any of the aforesaid methods, may be bleached by hydroxyl or a perborate or persulphate or by sulphurous or hydrosulphurous acid or in other cases, the solution may be treated with decolouring agents before it is precipitated.

The insoluble residues from the extraction of the caseo-albumens may be suitably dried when it is desired to utilize them for various purposes, and chiefly for the extraction of fatty substances, as well as for the manufacture of starch.

The caseo albumen of vegetable origin which I obtain by my said process will constitute a new substance which differs from all the caseins of vegetable origin hitherto obtained, as well as from casein of animal origin. This casein is free from alkali-albumens, starch, fatty matter and soaps. After drying, and when not decoloured, it has the appearance of a more or less translucent and horny substance, which is very hard when it is well dried. Its colour will depend upon the state of purity of the raw material and chiefly upon the method of operation, and is generally a more or less pronounced yellow, but may attain an amber or greenish or blackish yellow, or even a mahogany red. With the earth nut (or peanut), a product of good quality will show a brilliant fracture. The appearance of the fracture resembles that of rosin.

In the powdered state, this casein has the appearance of a white powder having a slightly brownish or amber hue, or otherwise greenish. In the state of small grains, it resembles sea sand.

Analysis of the earth nut or peanut casein in the state of flour shows that it may contain upwards of 10 per cent of water, less than 3 per cent of ash and about 14 per cent of nitrogen, also sulphur and phosphorus.

When this casein is redissolved in an excess of an acid or a base, it attains the maximum coagulation when the ionization has a determined value for each kind of raw material, and depending upon the said material. For the earth nut or peanut, this ionizing power is about 5,2, it being estimated in practice by the use of methyl red. This property may be utilized for the bleaching of the said alumino casein by a solution of sulphurous or hydrosulphurous acid.

The vegetable caseins and albumens which are obtained by my said process can be utilized for industrial purposes in the same manner as the animal caseins and albumens, and may be substituted therefor in all industries utilizing such caseins and albumens whether natural or hydrolyzed, and chiefly in the manufacture of baryta paper, adhesive substances and paint based upon casein, sizing for textile fabrics, agglomerated plastic substances, for the fixing of colours, and for other uses.

Further, the new manufactured product which is obtained in accordance with my said invention may be utilized in the manufacture of alimentary, pharmaceutic and dietetic products.

On the other hand, the solubilizing of the vegetable caseins by the neutral chlorides will have a very interesting field of use in the purifying of starch.

Having particularly described my said invention and the manner in which the same is to be performed, I declare that what I claim is:

1. A process for the manufacture of casein from vegetable substances comprising treating the raw material by an alkali chloride, purifying the product of this first step by the addition of lime, separating the insoluble substances, and coagulating the remaining liquor by treatment with acid, the coagulation being affected to the degree that $Ph=5,2$.

2. A process for the manufacture of casein from vegetable substances comprising washing the coagulated casein with water whose ionizing power has been brought to the critical value corresponding to the raw material employed, for instance $Ph=5,2$ for the peanut.

HENRI BEAUFOUR.